United States Patent
Hoehn et al.

[15] 3,697,532
[45] Oct. 10, 1972

[54] 5-METHYLDIPYRAZOLO [3,4-B;3',4'-D] PYRIDIN-3(2H)-ONES

[72] Inventors: Hans Hoehn, Tegernheim; Ernst Schulze, Regensburg, both of Germany

[73] Assignee: E. R. Squibb & Sons, Inc., New York, N.Y.

[22] Filed: Aug. 12, 1970

[21] Appl. No.: 63,326

[52] U.S. Cl.........260/295.5 T, 260/295.5 B, 424/266
[51] Int. Cl...............................................G07d 31/44
[58] Field of Search....................260/295 T, 295.5 T

[56] References Cited
OTHER PUBLICATIONS

Wiley, The Chemistry of Heterocyclic Compounds, Part 1, Wiley-Interscience, Pages 10–20, 1967

*Primary Examiner*—Alan L. Rotman
*Attorney*—Lawrence S. Levinson, Merle J. Smith, Donald J. Perrella and Burton Rodney

[57] ABSTRACT

New 5-methyldipyrazolo[3,4-b:3',4'-d]pyrdiin-3(2H)-ones are useful as central nervous system depressants. This type of compound also increases the intracellular concentration of adenosine-3',5'-cyclic monophosphate.

9 Claims, No Drawings

5-METHYLDIPYRAZOLO [3,4-B;3',4'-D] PYRIDIN-3(2H)-ONES

SUMMARY OF THE INVENTION

This invention relates to new 5-methyldipyrazolo-[3,4-b:3,4-d]pyridin-3(2H)-ones. These new compounds have the structural formula (I)
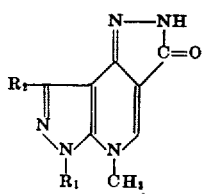

In Formula I $R_1$ represents lower alkyl, phenyl or phenyl-lower alkylene and $R_2$ represents hydrogen or lower alkyl.

Preferred compounds of Formula I are those in which $R_1$ is ethyl or benzyl, especially the first and $R_2$ is lower alkyl especially methyl.

DETAILED DESCRIPTION OF THE INVENTION

The lower alkyl groups represented by $R_1$ and $R_2$ include straight and branched chain aliphatic hydrocarbon groups of up to seven carbon atoms such as methyl, ethyl, propyl, isopropyl, butyl, t-butyl and the like. The phenyl-lower alkylene groups represented by $R_1$ are radicals in which a phenyl group is attached to a hydrocarbon chain like those above.

The new compounds are formed by the following series of reactions. The symbols in the structural formulas have the same meanings as previously described.

A 5-aminopyrazole of the formula (II)
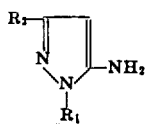

is produced as described in British Pat. No. 1,057,740, published Feb. 8, 1967, by ring closure of an aldehyde or ketone hydrazone of the formula (III)
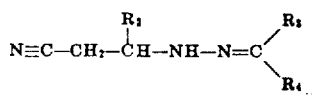

wherein $R_2$ is the same as previously defined and $R_3$ and $R_4$ each is hydrogen, lower alkyl, phenyl, phenyl-lower alkyl or cycloalkyl. The cyclization is effected by heating at a temperature of about 90° to 130° C. in an inert liquid solvent, e.g., an alcohol like ethanol, butanol or the like, preferably in the presence of a catalyst, e.g., alcoholates like alkali metal alcoholates particularly butylates such as sodium butylate.

This 5-aminopyrazole is reacted with an alkoxymethylene malonic acid ester of the formula (IV)
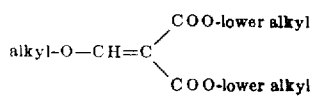

This may be effected by heating the reactants at a temperature of the order of 120° C. for several hours, and results in a compound of the formula (V)
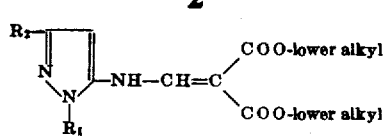

The alkoxymethylene malonic acid esters of formula IV are known compounds and are produced like ethoxymethylene malonic acid diethyl ester [Organic Syntheses 28, 60–62 (1948)].

Cyclization of a compound of Formula V produces a product of the formula (VI)
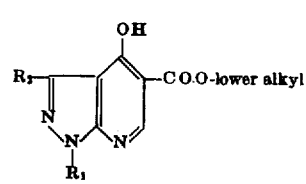

wherein $R_1$ and $R_2$ correspond respectively to $R_1$ and $R_2$ of the starting material. This reaction is carried out by heating the pyrazolyl-aminomethylene malonic acid ester of formula V in an inert organic solvent such as diphenyl ether at a temperature of about 230° to 260° C. for several hours while removing, e.g., by distillation, the alcohol (lower alkyl-OH). The product is then separated from the solvent, e.g., by fractional distillation.

The product of Formula IV is then alkylated, e.g., with a methyl halide such as methyl iodide. This reaction is effected by treating a salt, e.g., an alkali metal salt of a compound of the Formula VI with the methyl halide in the presence of a solvent, e.g., dimethylformamide at elevated temperatures. The resulting salt is neutralized by means of an aqueous sodium or potassium carbonate solution to obtain a compound of the formula (VII)
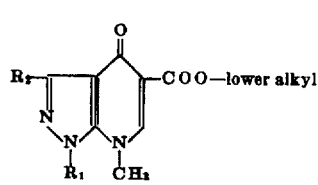

The material of Formula VII is dissolved in an inert, preferably dry organic solvent, e.g., an alcohol like ethanol, hydrazine or hydrazine hydrate is added and the reaction mixture is kept at about room temperature for up to about 24 hours. The product of Formula I is then isolated.

The new compounds of this invention are central nervous system depressants and may be used as tranquilizers or ataractic agents for the relief of anxiety and tension states, for example, in mice, cats, rats, dogs and other mammalian species, in the same manner as chlordiazepoxide. For this purpose a compound or mixture of compounds of Formula I may be administered orally or parenterally in a conventional dosage form such as tablet, capsule, injectable or the like. A single does, or preferably 2 to 4 divided daily doses, provided on a basis of about 1 to 50 mg. per kilogram per day, preferably about 2 to 15 mg. per kilogram per day, is appropriate. These may be conventionally formulated in an oral or parenteral dosage form by compounding about 10 to 250 mg. per unit of dosage with conventional vehicle, excipient, binder, preservative, stabilizer, flavor or the like as called for by accepted pharmaceutical practice.

The new compounds also increase the intracellular concentration of adenosine-3',5'-cyclic monophosphate, and thus by the administration of about 1 to 100 mg/kg/day, preferably about 10 to 50 mg/kg, in single or two to four divided doses in conventional oral or parenteral dosage forms such as those described above may be used to alleviate the symptoms of asthma.

The following examples are illustrative of the invention and constitute preferred embodiments. Other members of the group may be produced by the use of the appropriately substituted 5-aminopyrazole in the place of 1-ethyl-5-aminopyrazole. All temperatures are on the centigrade scale.

EXAMPLE 1

6-Ethyl-5,8-dimethyldipyrazolo[3,4-b:3',4'-d]pyridin-3(4H)-one a. [(1-ethyl-3-methyl-5-pyrazolyl)aminomethylene]malonic acid diethyl ester 245 g. (2.2 mol.) of 1-ethyl-3-methyl-5-aminopyrazole and 476 g. (2.2mol.) of ethoxymethylene malonic acid diethyl ester are heated to 120° (bath temperature) for 2 hours with stirring. The ethanol formed by this reaction is removed by means of a water aspirator. Then vacuum distillation (b.p. $_{0.1}$ 154–160°) yields 520 g. (84 percent of theory) of a quickly crystallizing oil [(1-ethyl-3-methyl-5-pyrazolyl)aminomethylene]malonic acid diethyl ester.

b. 1-ethyl-4-hydroxy-3-methyl-1H-pyrazolo[3,4-b]pyridine-5-carboxylic acid ethyl ester 253 g. (0.9 mol.) of [(1-ethyl-3-methyl-5-pyrazolyl)-aminomethylene]malonic acid diethyl ester are dissolved in 770 g. of diphenyl ether. The reaction mixture is heated to 235° – 250° (bath temperature) and allowed to react at this temperature for 1–2 hours while the resulting ethanol is continuously distilled off. The last amount of alcohol is removed by means of a water aspirator. The diphenyl ether is separated by distillation with a fractionating column in vacuo. The 1-ethyl-4-hydroxy-3-methyl-1H-pyrazolo[3,4-b]pyridine-5-carboxylic acid ethyl ester is obtained at b.p. $_{0.05}$ 115°– 120°, yield 195 g. = 92 percent of theory.

c. 1-ethyl-4,7-dihydro-3,7-dimethyl-4-oxo-1H-pyrazolo[3,4-b]-pyridine-5-carboxylic acid ethyl ester A mixture containing 49.8 g. (0.2 mol.) 1-ethyl-4-hydroxy-3-methyl-1H-pyrazolo[3,4-b]pyridine-5-carboxylic acid ethyl ester, 290 g. of powdered potassium carbonate, 290 ml. of dimethylformamide and 71 g. (0.5 mol. of methyl iodide is stirred 14 hours at 50°, then filtered under suction, while hot, from the excess potassium carbonate. Upon standing overnight, the 4-potassium salt of 1-ethyl-4-hydroxy-3-methyl-1H pyrazolo[3,4-b]pyridine-5-carboxylic acid ester-7-methyl ammonium iodide crystallizes with a certain amount of potassium carbonate. In order to obtain the 4-oxo compound, the potassium salt is dissolved in 75 ml. of water. After a short time, the 1-ethyl-4,7-dihydro-3,7-dimethyl-4-oxo-1H-pyrazolo[3,4-b]pyridine-5-carboxylic acid ethyl ester begins to crystallize.

By evaporating off the dimethylformamide mother liquor and treating the oily residue with ether, there is obtained an additional amount of the desired compound. The total yield amounts to 25 g = 47.5 percent of the theory. It is recrystallized from ethanol, m.p. 192°–193°. The ether solution contains the isomeric 1-ethyl-4-methoxy-3-methyl-1H-pyrazolo[3,4-b]pyridine-5-carboxylic acid ethyl ester. By distilling off the ether, there are obtained 27.5 g. (52 percent) of the 4-methoxy compound.

d. 6-Ethyl-5,8-dimethylpyrazolo[3,4-b:3',4'-d]pyridin-3(2H)-one

To 3.3 g. (0.0125 mol.) of 1-ethyl-4,7-dihydro-3,7-dimethyl-4-oxo-1H-pyrazolo[3,4-b]pyridine-5-carboxylic acid ethyl ester in 30 ml. of ethanol, there is added 1.25 g. (0.025 mol.) of hydrazine hydrate (100 percent) and the mixture is kept at room temperature for 24 hours. The precipitated compound (1.5 g.) is filtered under suction and the mother liquor is evaporated in vacuo providing, after being washed with water, an additional amount of 1.4 g. The precipitate as well as the mother liquor residue is recrystallized from absolute alcohol to obtain 2.75 g. (90 percent of theory) of 6-ethyl-5,8-dimethyldipyrazolo[3,4-b:3',4'-d]pyridin-3(2H)-one, m.p. 244°.

By replacing the 1-ethyl-3-methyl-5-aminopyrazole in part (a) of Example 1 with the appropriately substituted 5-aminopyrazole, the following additional compounds are obtained:

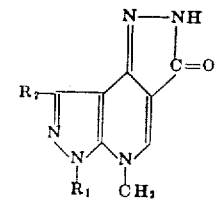

| Example | R₁ | R₂ |
|---|---|---|
| 2 | CH₃ | H |
| 3 | —⟨phenyl⟩ | H |
| 4 | C₂H₅ | H |
| 5 | C₂H₅ | C₂H₅ |
| 6 | —CH₂—⟨phenyl⟩ | CH₃ |
| 7 | —CH₂CH₂—⟨phenyl⟩ | H |
| 8 | ⟨phenyl⟩ | CH₃ |
| 9 | —CH₃ | CH₃ |

What is claimed is:
1. A compound of the formula

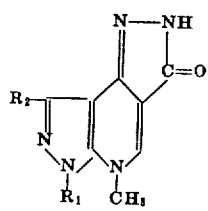

wherein $R_1$ is lower alkyl, phenyl or phenyl-lower alkylene and $R_2$ is hydrogen or lower alkyl.

2. A compound as in claim 1 wherein $R_1$ and $R_2$ each is lower alkyl.

3. A compound as in claim 1 wherein $R_1$ is lower alkyl and $R_2$ is hydrogen.

4. A compound as in claim 1 wherein $R_1$ is phenyl and $R_2$ is lower alkyl.

5. A compound as in claim 1 wherein $R_1$ is phenyl-lower alkylene and $R_2$ is lower alkyl.

6. A compound as in claim 1 wherein $R_1$ is ethyl and $R_2$ is methyl.

7. A compound as in claim 1 wherein $R_1$ is phenyl and $R_2$ is methyl.

8. A compound as in claim 1 wherein $R_1$ is benzyl and $R_2$ is methyl.

9. A compound as in claim 1 wherein $R_1$ and $R_2$ each is ethyl.

* * * * *